United States Patent
Lee et al.

(10) Patent No.: US 6,883,116 B2
(45) Date of Patent: Apr. 19, 2005

(54) METHOD AND APPARATUS FOR VERIFYING HARDWARE IMPLEMENTATION OF A PROCESSOR ARCHITECTURE IN A LOGICALLY PARTITIONED DATA PROCESSING SYSTEM

(75) Inventors: Van Hoa Lee, Cedar Park, TX (US); Charles Andrew McLaughlin, Round Rock, TX (US); Stephen Joseph Schwinn, Lakeville, MN (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 09/965,000

(22) Filed: Sep. 27, 2001

(65) Prior Publication Data

US 2003/0061540 A1 Mar. 27, 2003

(51) Int. Cl.[7] ............................................... G06F 11/00
(52) U.S. Cl. ........................... 714/30; 714/31; 714/739
(58) Field of Search ............................... 714/10, 11, 12, 714/30, 31, 739

(56) References Cited

U.S. PATENT DOCUMENTS

| | | | |
|---|---|---|---|
| 4,564,903 A | 1/1986 | Guyette et al. | 364/300 |
| 4,843,541 A | 6/1989 | Bean et al. | 364/200 |
| 5,345,590 A | 9/1994 | Ault et al. | 395/650 |
| 5,913,064 A * | 6/1999 | Chen | 717/108 |
| 6,098,182 A * | 8/2000 | Cowan | 714/25 |
| 6,212,604 B1 * | 4/2001 | Tremblay | 711/125 |
| 6,658,594 B1 * | 12/2003 | Bui et al. | 714/10 |
| 6,742,139 B1 * | 5/2004 | Forsman et al. | 714/23 |
| 2002/0120884 A1 * | 8/2002 | Nakamikawa et al. | 714/31 |

OTHER PUBLICATIONS

IBM Technical Disclosure Bulletin, "Hypervisor High Performance Synchronous Dispatch for Coupled Systems", vol. 39, No. 12, Dec. 1996.
IBM Technical Disclosure Bulletin, "VM MPG Operating as a DRF Hypervisor as a First Level Guest Under PR/SM", vol. 38, No. 04, Apr. 1995, p. 325.
IBM Technical Disclosure Bulletin, "Sharing Read–Only Memory among Multiple Logical Partitions", vol. 36, No. 03, Mar. 1993, pp. 303–304.
IBM Technical Disclosure Bulletin, "Highly Parallel Coupling Facility Emulator/Router with Shadowed Link Buffers", vol. 39, No. 12, Dec. 1996.
IBM Technical Disclosure Bulletin, "Coordinating Multiple Server Partitions to Enter Power–Save State", vol. 39, No. 06, Jun. 1996, pp. 235–239.

* cited by examiner

Primary Examiner—Scott Baderman
Assistant Examiner—Joshua Lohn
(74) Attorney, Agent, or Firm—Duke W. Yee; Mark E. McBurney; Wayne P. Bailey

(57) ABSTRACT

A method, apparatus, and computer instructions for testing hardware in a data processing system having multiple partitions. A monitor process in a first partition assigned to a first processor is initialized. A random code generation process in a second partition associated with a second processor is initialized. The random code generation process generates instructions and executes the instructions to test the second processor. The monitor process monitors the random code generation process and resets the second processor if the random code generation process fails.

14 Claims, 6 Drawing Sheets

100 DATA PROCESSING SYSTEM

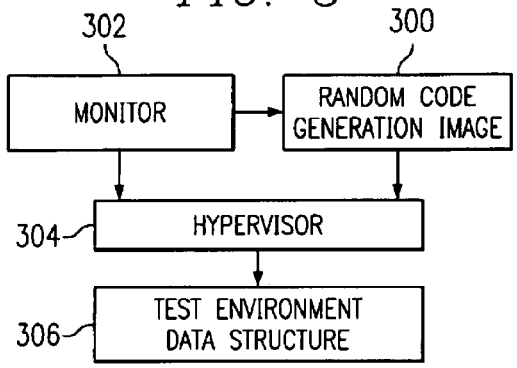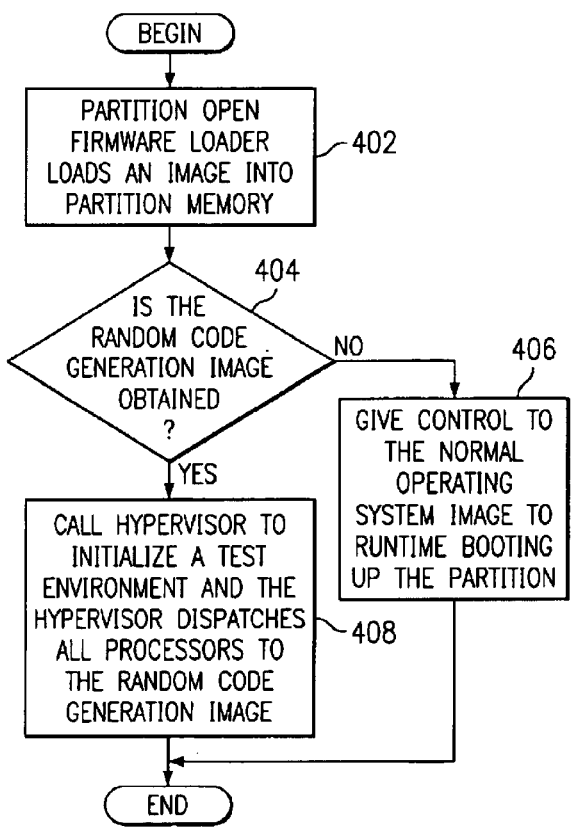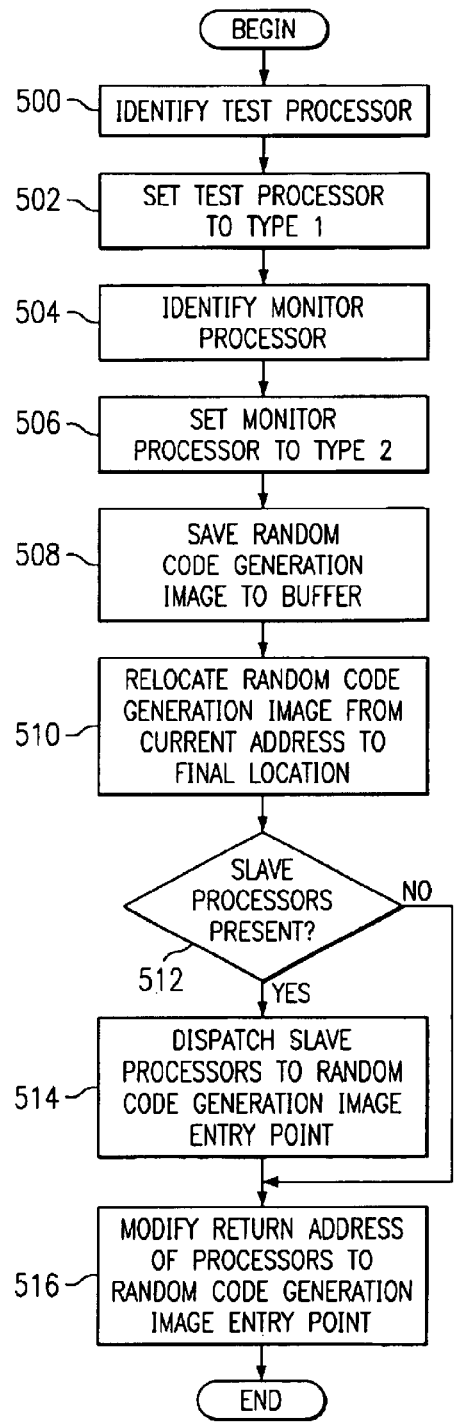

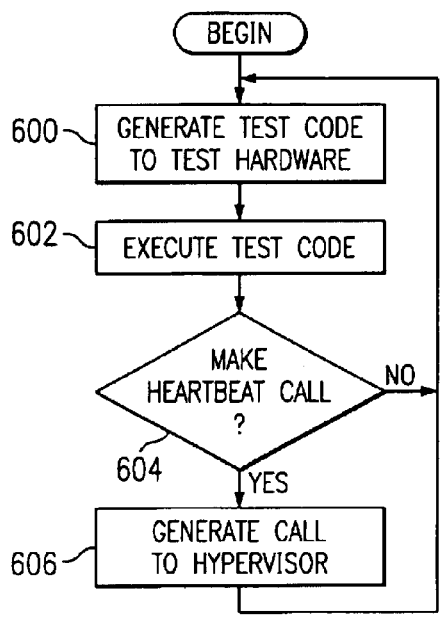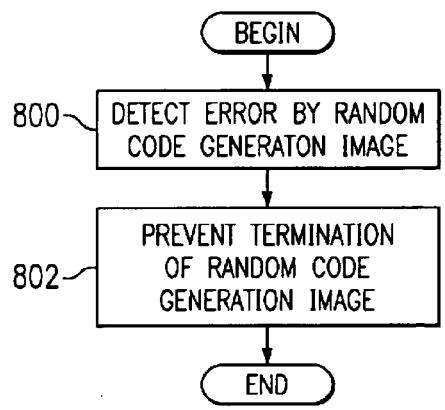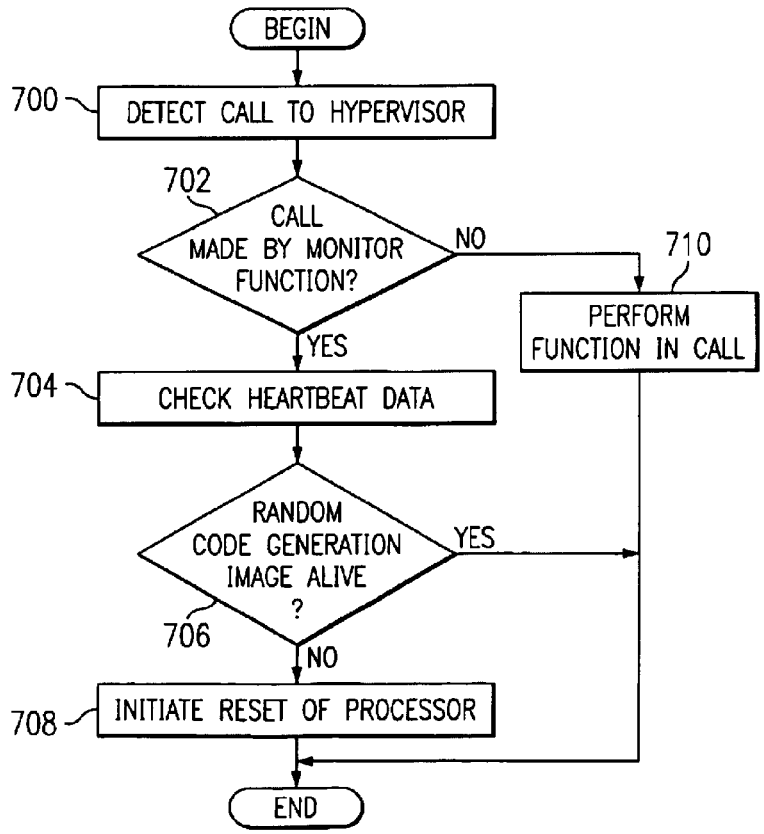

```
struct                                        902
{
    unsigned long heartbeat = 0;              /* increment one each time by the LTK processor making the  904
    "heartbeat" h-call */                                                                                  
    unsigned long last_heartbeat = -1;        /* capture the heartbeat into this field by the MONITOR processor */
    unsigned long timestamp = -1;             /* time stamp when the capture takes place if there is still
    heartbeat ticking */
} heartbeat[MAX_PROCS];           906
```

FIG. 9                                                                                    900

```
h_heartbeat()
{
    my_proc_id = get_proc_id();
    my_part_id = get_part_id();
    if ( my_part_id == GLOBAL_FW ) return;                       /* can't call from global FW */
    if ( proc_type[ my_proc_id ] != LTK_TYPE ) return;           /* processor is not running LTK */
    else
    {
        extern unsigned long refresh_frequency;
        extern PART_INFO part_info[];
        unsigned long newtime;

++heartbeat[ my_proc_id ].heartbeat;
        simple_lock( &part_info[ my_part_id ].refresh_lock );    /* serialize access to
        last_refresh_timestamp */
        newtime = get_current_time_ticks();
        if ( ( newtime - part_info[ my_part_id ].last_refresh_timestamp) > refresh_frequency )
        {
            /* time is up for a image refresh */
            restore_LTK_img_from_saved_copy();
            part_info[ my_part_id ].last_refresh_timestamp = get_current_time_ticks();
        }
        simple_unlock( &part_info[ my_part_id ].refresh_lock);
    }
}
```

FIG. 10                     1000

```
monitor_code()
{
    my_proc_id = get_proc_id();
    my_sister_id = get_sister_id( my_proc_id );
    if ( proc_type[ my_proc_id ] == MONITOR_TYPE )
    {
        if ( heartbeat[ my_sister_id ].last_heartbeat != heartbeat[ my_sister_id ].heartbeat )
        {
            /* there is heartbeat ticking, capture the new heartbeat and record new timestamp */
            heartbeat[ my_sister_id ].last_heartbeat = heartbeat[ my_sister_id ].heartbeat;
            heartbeat[ my_sister_id ].timestamp = get_current_time_ticks();
        }
        else
        {
            extern unsigned long heartbeat_frequency;
            unsigned long newtime;

/* if there is no heartbeat which exceeds the required heartbeat observed interval */
            /* initiate a reset to the LTK processor monitored by this processor */
            newtime = get_current_time_ticks();
            if ( (newtime - heartbeat[ my_sister_id ].timestamp) > heartbeat_frequency )
                reset_the_sister_LTK_processor();
        }
    }
}
```

FIG. 11  1100

```
monitor_glue_code:        # at a fixed location in hypervisor memory
    blr                   # Simply return
    b   monitor_code      # Call the actual monitor code
```

FIG. 12  1200

METHOD AND APPARATUS FOR VERIFYING HARDWARE IMPLEMENTATION OF A PROCESSOR ARCHITECTURE IN A LOGICALLY PARTITIONED DATA PROCESSING SYSTEM

BACKGROUND OF THE INVENTION

1. Technical Field

The present invention relates generally to an improved data processing system, and in particular to a method and apparatus for testing a processor architecture. Still more particularly, the present invention provides a method and apparatus for testing logical partitions in a logically partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

In testing architectures for LPAR data processing systems, code is often loaded into a logical partition to test the hardware implementation of the processor architecture. This type of code is referred to as a random code generator or a random code generation image. Random code generation images are typically designed to generate random instruction streams to stress test the hardware implementation of the processor architecture. A random code generation image tends to corrupt it's own memory image or crash the logical partition on a frequent basis. Such a result is undesirable because the point of the test using the random code generation image is to verify that these types of actions have no effect beyond the boundary of the logical partition.

Therefore, it would be advantageous to have an improved method, apparatus, and computer instructions for testing hardware implementations in a logical partitioned data processing system.

SUMMARY OF THE INVENTION

The present invention provides a method, apparatus, and computer instructions for testing hardware in a data processing system having multiple partitions. A monitor process in a first partition assigned to a first processor is initialized. A random code generation process in a second partition associated with a second processor is initialized. The random code generation process generates instructions and executes the instructions to test the second processor. The monitor process monitors the random code generation process and resets the second processor if the random code generation process fails.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used to test and verify a hardware implementation of a processor architecture in accordance with a preferred embodiment of the present invention;

FIG. 4 is a flowchart of a process for initiating a hypervisor call to set up a test environment in accordance with a preferred embodiment of the present invention;

FIG. 5 is a flowchart of a process used to hand control of a partition to a random code generation image in accordance with a preferred embodiment of the present invention;

FIG. 6 is a flowchart of a process used to test a hardware implementation of a processor architecture in accordance with a preferred embodiment of the present invention;

FIG. 7 is a flowchart of a process for handling a hypervisor call in accordance with a preferred embodiment of the present invention;

FIG. 8 is a flowchart of a process for managing an error from a random code generation image in accordance with a preferred embodiment of the present invention;

FIG. 9 is a diagram illustrating a heartbeat data structure in accordance with a preferred embodiment of the present invention;

FIG. 10 is a diagram illustrating pseudo code for generating a heartbeat in response to a heartbeat call in accordance with a preferred embodiment of the present invention;

FIG. 11 is a diagram illustrating pseudo code for a monitoring function in accordance with a preferred embodiment of the present invention; and FIG. 12 is a diagram illustrating glue code used to add a call for the monitor function for every hypervisor call in accordance with a preferred embodiment of the present invention.

DETAILED DESCRIPTION OF THE PREFERRED EMBODIMENT

Figure 1:
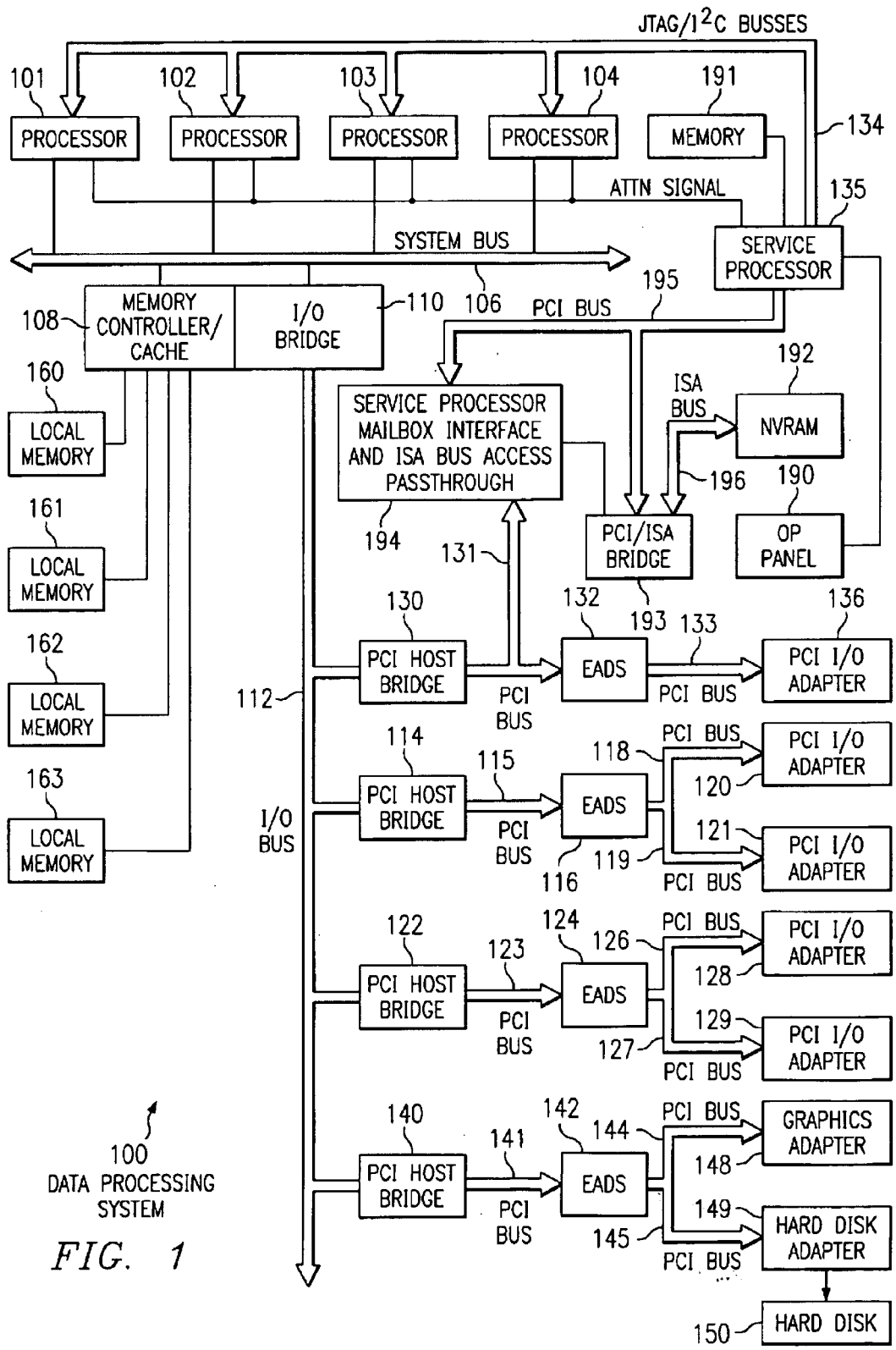
FIG. 1 is a block diagram of a data processing system in which the present invention may be implemented is depicted.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, and 136, graphics adapter 148, and hard disk adapter 149 may be assigned to different logical partitions.

Thus, for example, suppose data processing system 100 is divided into three logical partitions, P1, P2, and P3. Each of I/O adapters 120–121, 128–129, 136, and graphics adapter 148, and hard disk adapter 149, each of processors 101–104, and each of local memories 160–163 is assigned to one of the three partitions. For example, processor 101, local memory 160, and I/O adapters 120, 128, and 129 may be assigned to logical partition P1; processors 102–103, memory 161, and PCI I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by PCI busses 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI busses 141 and 144 as depicted. Also, a hard disk 150 may also be connected to I/O bus 112 through PCI Host Bridge 140 and EADS 142 via PCI busses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. ISA bus access pass-through logic 194 forwards PCI accesses destined to the PCI/ISA bridge 193. NVRAM storage 192 is connected to the ISA bus 196. Service processor 135 is coupled to service processor mailbox interface 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
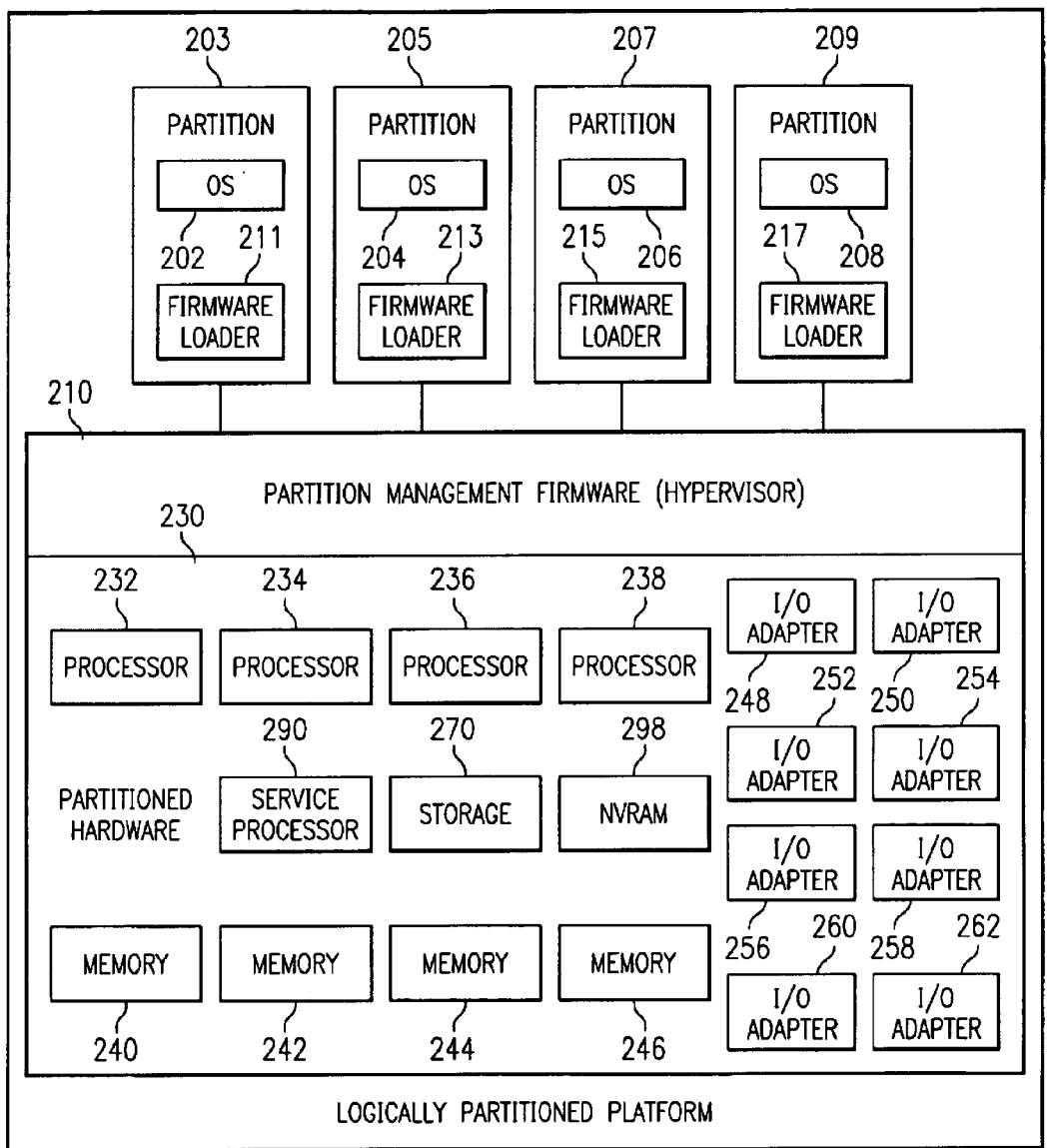
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 208 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

The present invention recognizes that in testing hardware implementation of a processor architecture for an LPAR data processing system, such as logically partitioned platform 200, corrupting of a memory image and crashing of a logical partition by a random code generation image is undesirable. The mechanism of the present invention monitors and keeps a random code generation image running to verify that these types of actions do not have an effect beyond the boundary of the partition of which the random code generation image is executed.

Turning next to FIG. 3, a diagram illustrating components used to test and verify a hardware implementation of a processor architecture is depicted in accordance with a preferred embodiment of the present invention. In this example, random code generation image 300 is used in conjunction with monitor 302 and hypervisor 304.

Random code generation image 300 is loaded onto a partition in place of a normal operating system. Random code generation image 300 may be implemented using a LPAR classical test kernel with random code generation program.

This code is loaded by the partition system firmware loader. In these examples, each partition has its own version of the open firmware which will create the open firmware device tree to describe the partition's hardware resources to an operating system. This firmware also is responsible for loading a client operating system into the partition's memory, and giving control to the client program. This firmware corresponds to firmware loaders 211, 213, 215, and 217 in FIG. 2.

In these examples, hypervisor 304 is the most trusted firmware of the LPAR system. Only one hypervisor instance exists at any one time in the LPAR system. Hypervisor 304 implements services and protections to ensure that all partition operating systems are properly running in their logical partitions, and using their allocated hardware resources. When random code generation image 300 is loaded, a call is made to hypervisor 304 to cause hypervisor 304 to recognize the presence of random code generation image 300 in place of a normal operating system. Random code generation image 300 executes within a partition and generates random instruction streams that are used to test the processor architecture assigned to the partition. Additionally, random code generation image 300 will make a call to hypervisor 304 to generate a heartbeat to indicate that this image is still running and has not failed.

Monitor 302 is used to monitor for the heartbeat generated by hypervisor 304 for random code generation image 300 to determine whether this image is running or has failed. Upon a failure of random code generation image 300, monitor 302 will reset the processor associated with random code generation image 300. This resetting of the processor may be accomplished by a call to hypervisor 304 or a direct call to the processor. A direct call may be made to the processor in which processor chips having two or more processors are used in the system. In this case, one processor is assigned to a partition in which random code generation image 300 is located while the other processor is assigned to a partition on which a normal operating system is running with monitor 302. One monitor is typically assigned to one processor, which executes the random code generation image for monitoring. Depending on the particular implementation, a single monitor process may be used to monitor more than one random code generation image.

The monitor process is loaded into the hypervisor memory during the system power-on condition. However, the monitor process is not activated until a random code generation image is loaded into a partition and a hypervisor call is made to set up the test environment for the random code genration image. At that time, one or more processors will be desinated to run the monitor process whenever they are making any hypervisor calls.

Hypervisor 304 serves to support the test environment created for random code generation image 300.

Hypervisor 304, in addition to the other functions, will allow random code generation image 300 to execute even if the memory image is corrupted or if an error is generated by the instructions created and executed by this image. Additionally, hypervisor 304 will reload random code generation image 300 if a failure occurs. The information used by hypervisor 304 to run, monitor, and refresh random code generation image 300 in the event of failure, is stored in test environment data structure 306.

In these examples, this data structure takes the form of a set of arrays in which each partition is associated with one of the arrays. Each array is initialized as either normal or test. A normal array indicates that a normal operation system image, such as Advanced Interactive Executive (AIX), is loaded while a test array indicates that a random code generation image, such as LCTrash, is loaded. AIX is an implementation of UNIX available from International Business Machines Corporation. Each array stores information, such as the processor associated with the partition, as well as the processor on which the monitor process is located.

Turning next to FIG. 4, a flowchart of a process for initiating a hypervisor call to set up a test environment is depicted in accordance with a preferred embodiment of the present invention. The process begins by the partition open firmware loader successfully loading an image into the partition memory (step 402). A determination is then made as to whether a random code generation image is obtained (step 404). If the loaded image is not the random code generation image, i.e. a normal operating system image, the open firmware will transfer control to the operating system image to continue booting up the partition (step 406) with the process terminating thereafter.

If the loaded image is indeed the random code generation image, the open firmware will call the hypervisor to intialize a test environment for the partition, and the hypervisor will dispatch the partition's processors to the random code generation image (step 408) with the process terminating thereafter.

With reference now to FIG. 5, a flowchart of a process used to hand control of a partition to a random code generation image is depicted in accordance with a preferred embodiment of the present invention. The process illustrated in FIG. 5 may be implemented in hypervisor 210 in FIG. 2. This process may be initiated by a processor making a call to the hypervisor to transfer control to the random code generation image. This processor is the master processor for the partition if more than one processor is present.

The process begins by identifying the test processor (step 500). This test processor is the processor associated with the partition in which the random code generation image is located. The identification includes identifying the processor ID in this example. A variable for this processor is set equal to type 1, which indicates that the processor is the test processor (step 502). For example, the variable may be proc_type[IDx]=LTK_TYPE(1) in which IDx is the identifier of the processor and LTK_TYPE(1) indicates that the processor is a test processor. This variable is initialized with a value of NORMAL (0) to indicate that it is a normal processor.

Next, a monitor processor is identified (step 504). A variable for the processor is set to type 2 to indicate that the processor is associated with a partition in which a monitor process is executed. The variable for this processor may be set as follows: proc_type[IDx]=MONITOR_TYPE(2) in which IDx represents the identifier for the processor and MONITOR_TYPE(2) indicates that the processor is associated with a partition running a monitor process. The random code generation image is saved to a buffer (step 508). A copy of this image is saved in the buffer to allow the hypervisor to reload the random code generation image into the partition if the random code generation image in the partition should fail during testing. The random code generation image is relocated from its current address to the final location for the partition (step 510). When the image is first loaded by the firmware, the image is loaded in a temporary location for assignment by the partition open firmware. Step 510 serves to move the image to its appropriate location, such as, for example, logical address 0 of the partition.

Then, a determination is made as to whether slave processors are present (step 512). A partition may have more than one processor. In this case, the processor executing open firmware and making the hypervisor to start this process is considered the master while the other processors are considered slaves. If slave processors are present, the slave processors are dispatched to the entry point of the random code generation image, such as, for example, logical address 0x100 (step 514). This step starts the running of the random code generation image. Thereafter, the return address of the processor making the call to transfer control to the random code generation image is modified to point to the entry point of the random code generation image (step 516) with the process terminating thereafter.

Returning to step 512, if slave processors are absent, the process proceeds directly to step 516 as described above.

Turning next to FIG. 6, a flowchart of a process used to test a hardware implementation of a processor architecture is depicted in accordance with a preferred embodiment of the present invention. The process illustrated in FIG. 6 may be implemented in a random code generation image, such as random code generation image 300 in FIG. 3.

The process begins by generating test code to test the hardware (step 600). The test code is then executed (step 602). A determination is made as to whether a heartbeat call should be generated (step 604). This determination may be made using a variety of mechanisms. For example, a threshold may be employed to determine whether the call should be made. This threshold may be, for example, a selected amount of code (i.e., 4K of code) generated by the random code generation image. If a heartbeat call is not to be made, the process returns to step 600. Otherwise, a call to the hypervisor to generate a heartbeat is made (step 606) with the process then returning to step 600 as described above.

Turning now to FIG. 7, a flowchart of a process for handling a hypervisor call is depicted in accordance with a preferred embodiment of the present invention. The process illustrated in FIG. 7 may be implemented in a monitor function, such as monitor 302 in FIG. 3. In these examples, the monitor function is an integral part of the hypervisor. The function is activated in the presence of a partition whose processors are executing the random code generation image.

The process begins by detecting a call to the hypervisor (step 700). Next, a determination is made as to whether the call was made by a monitor-type processor (step 702). If the call was made by a monitor-type processor, heartbeat data is checked (step 704). A determination is then made as to whether the test processor, who is executing the random code generation image and being monitored, is alive (step 706). If the test processor who is executing the random code generation image is not alive, then a reset of the test processor is initiated (step 708) with the process terminating thereafter.

Turning back to step 706, if the test processor, executing the random code generation image, is alive, the process terminates. Then, with reference again to step 702, if the call is not made by a monitor-type processor, the normal hypervisor function is performed (step 710) with the process then terminating.

Turning now to FIG. 8, a flowchart of a process for managing an error from a random code generation image is depicted in accordance with a preferred embodiment of the present invention. The process illustrated in FIG. 8 may be implemented in hypervisor 304 in FIG. 3.

The process begins by detecting an error from the random code generation image (step 800). In these examples, the hardware detects error conditions. This detection is achieved through a non-maskable machine check interrupt. This interrupt is detected by the processor.

Thereafter, termination of the random code generation image is prevented (step 802) with the process terminating thereafter. The machine check interrupt handler verifies that the processor is a test processor from the partition running the random code generation image. If that case is true, the partition will not be terminated. The hypervisor will invoke the machine check error analysis to identify the error and clean up the error source. Thereafter, the test processor is sent back to the random code generation image's machine check recovery entry point for further action by the image.

In these examples, data is collected for analysis. During the execution of the random code, a periodic heartbeat hypervisor call is made. The heartbeat hypervisor call will display the heartbeat count of the test processor to the partition's display console. When the test processors' heartbeats are no longer displayed on the console, this indicates a crash of the system. Then, the appropriate action is to concentrate on debugging the cause of the crash to uncover any hardware implementation problem or hypervisor code bug. Another indication of a potential problem is when the other normal partitions crash while the random generation code image is running.

Turning next to FIG. 9, a diagram illustrating a heartbeat data structure is depicted in accordance with a preferred embodiment of the present invention. Data structure 900 is a heartbeat data structure, which is generated in response to a call from the random code generation image to the hypervisor to generate a heartbeat. A data structure, such as data structure 900, is generated for each processor in the system. In this example, data structure 900 is shown with its initial values. A value for the heartbeat is incremented in line 902 each time the random code generation image makes a call. The heartbeat value is captured or stored by the monitor processor in line 904. In line 906, a time stamp of the capture occurs if a heartbeat is still present.

Turning next to FIG. 10, a diagram illustrating pseudo code for generating a heartbeat in response to a heartbeat call is depicted in accordance with a preferred embodiment of the present invention. Code 1000 is an example of code executed by a hypervisor in response to receiving a call from a random code generation image to generate a heartbeat. This pseudo code is C pseudo code.

With reference now to FIG. 11, a diagram illustrating pseudo code for a monitoring function is depicted in accordance with a preferred embodiment of the present invention. In this example, code 1100 is pseudo C code which illustrates code used to capture a heartbeat and reset the processor associated with the random code generation image if no heartbeat is present within a required interval.

Turning next to FIG. 12, a diagram illustrating glue code used to add a call for the monitor function for every hypervisor call is depicted in accordance with a preferred embodiment of the present invention. Code 1200 illustrates fixed assembly code for adding a call to the monitor function for every hypervisor call that is made. The code is implemented as assembly code to minimize any impact on the normal hypervisor call. Every hypervisor call will call the monitor__glue__code subroutine. In the absence of a random code generation image, the routine simply returns back to the caller without calling the actual monitor__code C-function. When a random code generation image is loaded and the specific hypervisor call is made to set up the test environment, the hypervisor will change the "return from subroutine" instruction, i.e. "blr", into the "no-op" instruction, i.e. "ori 0,0,0". This effectively activates the monitor function for every hypervisor calls.

Thus, the present invention provides an improved method, apparatus, and computer instructions for running, monitoring, and refreshing a random code generation image used to verify a hardware implementation of the processor architecture. The mechanism of the present invention employs a monitor function and modifications to the hypervisor as described above to maintain execution of a random code generation image even when the memory image or the logical partition for the random code generation image is corrupted or crashes. In this manner, the mechanism of the present invention allows for testing to verify whether the various actions of the random code generation image have any effect beyond the boundary of the partition in which the random code generation image is executing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for testing hardware in the data processing system having multiple partitions including a first partition and a second partition, each of the multiple partitions configurable by the data processing system for running an operating system image therein, the method comprising:

initializing a monitor process in the first partition assigned to a first processor; and initializing a random code generation process in the second partition associated with a second processor, wherein the random code generation process generates instructions and executes the instructions to test the second processor and wherein the monitor process monitors the random code generation process and resets the second processors if the random code generation process fails.

2. The method of claim 1, wherein the random code generation process generates a heartbeat used by the monitor process to determine whether the random code generation process has failed.

3. The method of claim 2, wherein the random code generation process calls a function to store data for the heartbeat in a data structure.

4. The method of claim 3, wherein the monitor process monitors the random code generation process by checking the data structure.

5. The method of claim 1, wherein the first processor and the second processor are located in a single chip.

6. The method of claim 1 further comprising:

responsive to detecting an error executing the instructions in the second partition, preventing termination of the second partition.

7. A data processing system comprising:

a bus system;

a communications unit connected to the bus system;

a memory system connected to the bus system, wherein the memory system comprises a plurality of partitions including a first partition and a second partition, each of the plurality of partitions configurable by the data processing system for running an operating system image therein; and a processing unit connected to the bus system, wherein the processing unit executes the set of instructions to initialize a monitor process in the first partition assigned to a first processor and initialize a random code generation process in the second partition associated with a second processor in which the random code generation process generates instructions and executes the instructions to test the second processor and in which the monitor process monitors the random code generation process and resets the second processors if the random code generation process fails.

8. A data processing system for testing hardware in the data processing system having multiple partitions including a first partition and a second partition, each of the multiple partitions configurable by the data processing system for running an operating system image therein, the data processing system comprising:

first initializing means for initializing a monitor process in the first partition assigned to a first processor; and second initializing means for initializing a random code generation process in the second partition associated with a second processor, wherein the random code generation process generates instructions and executes the instructions to lest the second processor and wherein the monitor process monitors the random code generation process and resets the second processors if the random code generation process falls.

9. The data processing system of claim 8, wherein the random code generation process generates a heartbeat used by the monitor process to determine whether the random code generation process has failed.

10. The data processing system of claim 9, wherein the random code generation process calls a function to store data for the heartbeat in a data structure.

11. The data processing system of claim 10, wherein the monitor process monitors the random code generation process by checking the data structure.

12. The data processing system of claim 8, wherein the first processor and the second processor are located in a single chip.

13. The data processing system of claim 8 further comprising:

preventing means, responsive to detecting an error executing the instructions in the second partition, for preventing termination of the second partition.

14. A computer program product in a computer readable medium for testing hardware in a data processing system having multiple partitions including a first partition and a second partition, each of the multiple partitions configurable by the data processing system for running an operating system image therein, the computer program product comprising:

first instructions for initializing a monitor process in the first partition assigned to a first processor; and second instructions for initializing a random code generation process in the second partition associated with a second processor, wherein the random code generation process generates instructions and executes the instructions to test the second processor and wherein the monitor process monitors the random code generation process and resets the second processors if the random code generation process fails.

* * * * *

UNITED STATES PATENT AND TRADEMARK OFFICE
CERTIFICATE OF CORRECTION

PATENT NO. : 6,883,116 B2  
DATED : April 19, 2005  
INVENTOR(S) : Lee et al.

It is certified that error appears in the above-identified patent and that said Letters Patent is hereby corrected as shown below:

Column 12,  
Line 5, after "instructions to" delete "lest" and insert -- test --.  
Line 8, after "process" delete "falls" and insert -- fails --.

Signed and Sealed this

Twenty-fifth Day of April, 2006

JON W. DUDAS  
*Director of the United States Patent and Trademark Office*